United States Patent [19]

Auclair et al.

[11] 4,385,157

[45] May 24, 1983

[54] EMULSION POLYMERIZATION PROCESS FOR ABS POLYBLENDS

[75] Inventors: Richard M. Auclair, Westfield; Rajendra Paul, Agawam, both of Mass.

[73] Assignee: Monsanto Company, St. Louis, Mo.

[21] Appl. No.: 325,260

[22] Filed: Nov. 27, 1981

[51] Int. Cl.³ ............................................. C08F 279/02
[52] U.S. Cl. .................................... 525/316; 526/340.1
[58] Field of Search .............. 525/316; 526/335, 340.1

[56] References Cited

U.S. PATENT DOCUMENTS

| | | | |
|---|---|---|---|
| 3,509,237 | 4/1970 | Aubrey | 525/316 |
| 3,855,355 | 12/1974 | Moore | 525/316 |
| 4,012,462 | 3/1977 | Chaudhary | 525/316 |
| 4,046,839 | 9/1977 | Papetti | 525/316 |
| 4,146,589 | 3/1979 | Dupre | 525/53 |
| 4,214,056 | 7/1980 | Lavengood | 525/316 |
| 4,252,912 | 2/1981 | Tokas | 525/316 |
| 4,254,236 | 3/1981 | Burk | 525/316 |

FOREIGN PATENT DOCUMENTS 832523 1/1970 Canada .

Primary Examiner—Paul R. Michl
Attorney, Agent, or Firm—Michael J. Murphy; William J. Farrington; Paul D. Matukaitis

[57] ABSTRACT

This invention relates to a novel emulsion polymerization process for preparing a latex of rubber particles having a bimodal rubber particle size distribution of large and small particles followed by grafting said rubber particles with a monomer mixture forming a polyblend of said grafted rubber particles and a matrix phase polymer of said monomers.

21 Claims, No Drawings

EMULSION POLYMERIZATION PROCESS FOR ABS POLYBLENDS

BACKGROUND OF THE INVENTION

As is well known, graft polyblends of rubbers with various vinylidene polymers have advantages in providing compositions of desirable toughness, chemical resistance and good formability. ABS polyblends have proven particularly advantageous in many application, and modifications of such ABS polyblends include the substitution of alkyl acrylate esters for a portion of the vinylidene monomer components, variations of the ratio of styrene-type and acrylonitrile-type monomers and the use of saturated rubbers such as acrylate rubbers as the substrate for the graft.

In the U.S. Pat. No. 3,509,238 granted Apr. 28, 1970 to Aubrey and Jastrzebski, there is disclosed and claimed an ABS-type polyblend containing graft copolymers having distinct degrees of grafting to provide a highly desirable balance of properties, the lowly grafted polymer apparently tending to cluster and simulate a larger particle size graft copolymer to provide a very high degree of impact resistance. In U.S. Pat. No. 3,509,237 granted to Norman E. Aubrey on Apr. 28, 1970, there is disclosed and claimed an ABS-type polyblend wherein there are graft copolymer particles of relative small size and other graft copolymer particles of relatively large size. A relatively small amount of the large particles provides greatly enhanced impact resistance in combination with the small particles while the larger amount of the smaller particles extends the effectiveness of the large particles to levels which larger amounts of either do not provide. Additionally, the volume of small particles masks the undesirable effects of the larger particles upon the overall balance of properties.

The concepts of the aforementioned patents have been widely employed in commercial compositions. In the commercial use of the concept of the latter of the above mentioned patents, the large particle component has been provided by a mass/suspension polymerization process and the smaller particle component has been provided by an emulsion polymerization process. There has been a desire to prepare both components by emulsion processes, mostly desirably in a single reactor, in an effort to minimize costs. However, grafts of purchased latices having a large average particle size have not proven so effective as the mass/suspension graft copolymers.

More recently, U.S. Pat. No. 3,652,721 to Dalton et al. has disclosed a process wherein small rubber particles are grafted in emulsion and combined with a grafted large agglomerated rubber particle to form ABS polyblends having a bimodal rubber particle size distribution. The product is considered to have high utility, however, the several separate batch operations to form the two sized modes of the rubber particles reduces process efficiencies. U.S. Pat. No. 3,663,656 to Ford et al. discloses a similar process wherein small rubber particles are grafted in a first emulsion followed by the addition of an emulsion of large rubber particles to the first emulsion and a completion of the grafting of the large particles to provide an ABS polyblend having a bimodal distribution of grafted rubber particles. Here again the separate batch steps reduces process efficiencies.

It is an object of the present invention to provide a novel polymerized polyblend of emulsion polymerized graft copolymers having different particle sizes and affording a highly desirable balance of properties.

It is also an object to provide a process for making such polyblends of emulsion graft copolymers which is relatively simple and economical in operation and which is adapted to facile variation to accommodate variations in particle size and grafting level.

Another object is to provide such polyblends which may be produced in a single reactor and in a single graft polymerization cycle.

SUMMARY OF THE INVENTION

The present invention relates to a process for preparing ABS polyblends by emulsion polymerization comprising:
A. polymerizing a diene monomer formulation dispersed in an aqueous medium by using an anionic emulsifier in a first amount sufficient to disperse and form a first mode of diene rubber particles having a particle size of about 0.2 to 0.5 microns as a portion of said monomer formulation is polymerized to about 5 to 50% conversion,
B. adding additional anionic emulsifier to said aqueous medium after step (A), in a second amount sufficient to disperse and form a second mode of diene rubber particles smaller than said first mode as said monomer formulation is further polymerized,
C. continuing the polymerization of said monomer formulation to a total conversion of about 70 to 100% forming a latex of diene rubber particles having a bimodal rubber particle size distribution of said first and second mode rubber particles,
D. charging a monomer mixture comprising alkenyl aromatic and alkenyl nitrile monomer to said latex,
E. polymerizing said monomer mixture in said latex such that a first portion of said monomer is grafted to said first and second mode rubber particles with a second portion of said monomer mixture forming a matrix polymer of said monomers,
F. separating said grafted rubber particles and said matrix polymer from said latex, said grafted rubber particles having a bimodal particle size distribution and being dispersed in said matrix polymer as a polymeric polyblend.

PREFERRED EMBODIMENTS

Diene Monomer Formulation

The diene monomer formulation can comprise one or more conjugated 1,3-dienes, e.g., butadiene, isoprene, piperylene, chloroprene, etc. Such rubbers include homopolymers of conjugated 1,3-dienes and interpolymers of such 1,3-dienes with up to an equal amount by weight of one or more copolymerizable monoethylenically unsaturated monomers, such as monovinylidene aromatic hydrocarbons (e.g., styrene; an aralkylstyrene, such as the o-, m-, and p-methylstyrenes, 2,4-dimethylstyrene, the ar-ethylstyrenes, p-tert-butylstyrene, etc.; and alpha-alkylstyrene, such as alphamethylstyrene, alphaethylstyrene, alpha-methyl-m-methylstyrene, etc.; vinyl naphthalene, etc.); arhalo monovinylidene aromatic hydrocarbons (e.g. the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketones, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2% of a crosslinking agent, based on the weight of the rubber-forming monomer or monomers, excessive crossslinking can result in loss of the rubbery characteristics. However, crosslinking of the rubber graft is desirable to preserve proper morphology of the particles thus produced. Accordingly, some crosslinking during the grafting reaction is advantageous and inherent crosslinking can be further encouraged through the variation of graft polymerization conditions as is well known in the art. Thus, rubber graft particles of spherical form and proper size may be obtained and maintained even during mechanical processing to achieve the desired dispersion thereof in the rigid matrix when such a technique is employed. The crosslinking agent can be any of the agents conventionally employed for crosslinking diene rubbers, e.g., divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

A preferred group of rubbers are those consisting essentially of 70 to 100% by weight of butadiene and/or isoprene and up to 30% by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95% by weight butadiene and 5 to 10% by weight of acrylonitrile or styrene.

Monomer Mixture

When styrene and acrylonitrile monomers are used jointly to graft the diene rubber particles and form the matrix polymer, the formed mixture of polymers are called ABS polyblends. However, the monomer mixture can incorporate other monomers in the monomer mixture and also include initiators, stabilizers and molecular weight modifiers as needed.

Exemplary of the alkenyl aromatic monomers that can be interpolymerized are styrene, alpha-alkyl monovinylidene monoaromatic compounds, e.g., alpha-methylstyrene, alpha-ethylstyrene, alpha-methylvinyltoluene, alpha-methyl dialkylstyrene, etc., ring-substituted alkyl styrene, e.g., vinyl toluene, o-ethylstyrene, p-ethylstyrene, 2-4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrenes, 2,6-dichloro-4-methylstyrene, etc.; vinyl naphthalene; vinyl anthracene, etc. The alkyl substituents generally have one to four carbon atoms and may include isopropyl and isobutyl groups. If so desired, mixtures of such monovinylidene aromatic monomers may be employed.

Exemplary of other alkenyl monomers that may be interpolymerized with alkenyl aromatic monomers are ethylenically unsaturated nitriles, such as acrylonitrile, methacrylonitrile, ethacrylonitrile and mixtures thereof; alpha- or beta-unsaturated monobasic acids and derivatives thereof, e.g., acrylic acid, methyl acrylate, ethyl acrylate, butyl acrylate, 2-ethylhexyl acrylate, methacrylic acid and the corresponding esters thereof; acrylamide, methacrylamide; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of various of the foregoing materials useful as comonomers in an interpolymer will vary.

The preferred monomer mixtures of the present invention consist at least principally of a alkenyl aromatic hydrocarbon and a nitrile, i.e., such monomers comprise at least 50.0% by weight and preferably at least 75.0% by weight of the mixture. Most desirably, such monomers comprise at least 90.0% by weight of the formulation and the usual commercial compositions are substantially completely comprised of such monomers although minor amounts, i.e., less than 5.0% by weight of other components such as chain transfer agents, modifiers, etc., may be included.

These preferred polymerizable monomer mixtures contain at least 10% by weight of the aromatic hydrocarbon monomer and preferably at least 50% by weight thereof. They also contain at least 5% by weight of the alkenyl nitrile and preferably as least 10% by weight thereof. From the standpoint of highly advantageous commercial practice, to produce advantageous ABS products, the monomer formulations contain 20 to 95%, and preferably 60 to 85%, by weight of the alkenyl aromatic hydrocarbon and 80 to 5%, and preferably 40 to 15%, by weight of the alkenyl nitrile.

Emulsion Polymerization of the Rubber

The diene monomer formulation is polymerized in an aqueous medium in a weight ratio of about 0.6:1 to 4:1 parts water to monomer formulation. An anionic emulsifier is used to disperse the monomer phase in the water phase. In step (A), smaller amounts of emulsifier is used such that the rubber particles being formed in the surfactant micelles has less than the critical micelle concentration (CMC) of the emulsifier. This concentration allows the rubber particles being formed to be larger and also to agglomerate at steady state polymerization and conversion to a larger controlled particle size in the range of about 0.2 to 0.5 microns. This is larger than in normal emulsion polymerization wherein larger amounts of surfactant or emulsifier produce particles of about 0.01 to 0.2 microns.

The (CMC) critical micelle concentration for typical emulsifiers or surfactants at 50° C. in pure water are given in moles of surfactant per liter of water in the "Encyclopedia of Polymer Science and Technology," Interscience Publishers, Division of John Wiley and Sons, Inc., New York, N.Y., Volume 5, pages 818. CMC is defined as the molar concentration of emulsifier below which no micelle formation occurs. The moles per liter of water can range from 0.0008 for potassium stearate, 0.001 for potassium, 0.003 for potassium palmitate oleate, to 0.01 for sodium rosinate and 0.393 for potassium caprylate as shown in the cited reference. Based on CMC requirements the anionic surfactant can range from about 0.001 to 0.01 moles/liter of water to form the micelles necessary for polymerization. Based on 100 parts of monomers, generally, the anionic emulsifier can be present in an amount of about 0.5 to 5.0 parts to prepare particles in the range of 0.2 to 0.5 microns depending on the emulsifier selected. If the anionic emulsifier is present in an amount of about 2.0 to 10 parts per 100 parts of monomer then particles of about 0.01 to 0.2 microns can be formed depending on the particular emulsifier selected.

The most widely used anionic surfactants are the alkali salts of saturated or unsaturated organic carboxylic acids with chain lengths between about $C_{12}$ and $C_{18}$ (laurate-stearate oleic acid range) and are commonly called soaps or fatty acid soaps based on sodium or potassium salts thereof. The Rubber Reserve Soap is a commercially available anionic emulsifier and is based on a mixture of fatty acid having $C_{12}$ to $C_{18}$ carbon atoms. An analysis shows 3.5% myristic, 20% palmitic, 28% stearic at $C_{14}$, $C_{16}$ and $C_{18}$ carbons respectively with about 37% oleic at $C_{18}$ being unsaturated.

Surfactants such as the alkyl sulfates and alkyl or alkylaryl-sulfonates are another group of surfactants which are more acid stable types and are used conventionally as secondary emulsifiers having a CMC value which is higher and does not form micelles as readily but do stabilize formed rubber particles, inhibiting coagulation or flocculation. The alkali salts of decyl, dodecyl, tetradecyl sulfonate or sulfate have CMC values of about 0.006 to 0.04. Also alkyl benzene and alkyl naphthaline sulfonates are used as anionic surfactants, e.g., the sodium salt of a diphenyloxide sulfonate all described in the cited reference.

The wood rosin soaps have been developed as emulsifiers wherein abietic acid has been hydrogenated or disproportionated to remove conjugated unsaturation that inhibits polymerization and used as sodium and potassium rosin acid soaps. The CMC values of such soaps are about 0.01 to 0.03 moles/liter, hence, requires as much as ten times the concentration as a sodium stearate or oleate soap to form micelles but are about equally functional at about 5 to 10 parts (per 100 parts of monomers) with fatty acid soaps. Both are used to make commercial rubbers in the range of 0.01 to 0.2 microns in rubber particle. Simple experimentation with any given anionic emulsifier can be carried out by free radical polymerizing butadiene monomer in an aqueous medium with the emulsifier used in a concentration about at its CMC value. The size of the particle will be essentially at its largest size at this concentration and can be measured by electron microscope micrographs. The soap then can be plotted versus rubber particle size and emulsion stability as the emulsifier is increased in concentration to form a particle in the range of 0.2 to 0.5 microns for any particular emulsifier.

Electrolytes may be used with the emulsifier to reduce surface tension and the amount of emulsifier needed. Operable amounts in the range of about 0.1 to 3.0 parts or as high as 3 to 5 parts can be used. Such electrolytes include inorganic electrolytes, e.g., halides, sulfates, nitrates and phosphates including sodium, potassium and lithium salts thereof.

The rubber polymerization is carried out by charging the water, emulsifier and optionally electrolytes and modifiers (0.3%) such as mercaptans to a reactor which is heated to about 20° to 100° C. The aqueous phase is purged with nitrogen respeatedly with agitation to remove essentially all oxygen. The butadiene (diene monomer) is then completely charged with a water soluble initiator, e.g., potassium persulfate in amounts of 0.1 to 2% based on monomer. The polymerization is carried out versus time which is correlatable with conversion. Maximum rubber particle size of 0.2 to 0.5 microns will generally be formed in the first 5% to 50% of conversion when the first soap concentration is essentially completely used. A second add of soap is then added to convert the remaining diene monomer. Amounts of 0.5 to 10 parts based on 100 parts of monomers can be used to start and form a second generation of smaller rubber particles in the range of about 0.01 to 0.2 microns. A bimodal rubber particle size distribution is desired wherein 5 to 50%, preferably 10 to 40% of the rubber particles are large and in the range of 0.2 to 0.5 microns. Hence, generally, the conversion can be carried out to about 5 to 30% with the proportion of large particles being determined by the conversion. Since most of the micelles disappear in this range of conversions and soap concentration, very few new particles will be formed. The focus of polymerization is then in the rubber particle and since they are larger and fewer in number the polymerization rate is very slow and, hence, conversions beyond 5 to 30% is not generally carried out.

Since the large particles are now formed in an amount of 5 to 50% based on the monomers, a second anionic emulsifier charge 0.5 to 10 parts, based on the monomers, is added to start a second population of rubber particles in the range of 0.01 to 0.2 microns.

The polymerization is then carried out to 70 to 100% conversion and the residual monomers stripped via venting or steam stripping. The conversion can be terminated at 70 to 75% conversion to prepare rubber particles with a low level of crosslinking or gels, however, since stable rubber particles or rubber substrate are needed for grafting, the conversions are generally taken to higher levels where crosslinking occurs.

Graft Polymerization Process

The graft copolymer is prepared by polymerizing the monomer mixture in the presence of the preformed rubber substrate, generally in accordance with conventional graft polymerization techniques. In such graft polymerization, the preformed rubbery polymer substrate generally is dispersed with the monomer in the latex and this admixture is polymerized to combine chemically or graft at least a portion of the polymer upon the rubber substrate. Depending upon the ratio of monomers to rubbery substrate and polymerization conditions, it is possible to produce both the desired degree of grafting of the polymer onto the rubbery substrate and the polymerization of ungrafted polymer to provide the desired amount of matrix polymer at the same time. Normally, the ratio of monomers to rubber charged to the graft polymerization reaction is the primary determinant of the superstrate: substrate ratio of the resultant graft copolymer. However conditions of polymerization, rubber chemistry and particle size, rates of monomer addition, chain transfer agents, etc., also exert an effect.

The initiator or catalyst is generally included within the range of 0.001 to 2.0% by weight, and preferably on the order of 0.005 to 0.5% by weight of the polymerizable monomer, depending upon the monomers and the desired polymerization cycle. The initiator may be added incrementally to facilitate optimum grafting.

As is well known, it is often desirable to incorporate molecular weight regulators such as mercaptans, halides and terpenes in relatively small percentages by weight, on the order of 0.001 to 3.0% by weight of the polymerizable monomer. In addition, it may be desirable to include relatively small amounts of antioxidants or stabilizers such as the conventional alkylated phenols, although these may be added during or after polymerization.

In the polymerization process, monomer mixture and rubbery substrate latex are emulsified in water by use of suitable anionic emulsifying agents such as fatty acid soaps, alkali or ammonium soaps of high molecular weight alkyl or alkaryl sulfates or sulfonates, mineral acid salts of long chain aliphatic amines, etc. Emulsifying agents which have proven particularly advantageous are sodium rosinate, oleate, sodium palmitate, sodium stearate and other sodium soaps. Generally, the emulsifying agent is provided in amounts of about 0.1 to 15 parts by weight per 100 parts by weight of the monomer mixture and water is provided in an amount of about 1 to 4 parts per part of monomer mixture, and even in larger ratios where greater dilution is desirable.

If so desired, the aqueous latex formed in the emulsion polymerization of the rubbery substrate may provide the aqueous medium into which the monomer formulation is incorporated with or without additional emulsifying agents, water, etc. However, the rubbery polymer may be dissolved in the monomer mixture and the mixture emulsified, or a latex thereof may be separately prepared.

Various water soluble free radical polymerization initiators are conventionally used for emulsion polymerization of the rubber monomers including conventional peroxy and azo catalysts, and the resultant latex containing residual initiator may be used as the aqueous medium with which the polymerizable monomers are mixed. Usually additional initiator will be added for graft polymerization. Exemplary of peroxy catalysts are the alkali metal peroxides, persulfates, perborates, peracetates and percarbonates, and hydrogen peroxide. If so desired, the initiator may be activated to form a redox system. In addition, it may be advantageous to include an oil-soluble initiator such as di-tert-butyl peroxide, benzoyl peroxide, lauroyl peroxide, oleyl peroxide, toluyl peroxide, di-tert-butyl-diperphthalate, tert-butyl peracetate, tert-butyl perbenzoate, dicumoyl peroxide, tert-butyl peroxide, isopropyl peroxy dicarbonate, 2,5-dimethyl -2,5-di-(tert-butylperoxy) hexane, 2,5-dimethyl-2,5-di(tert-butyl peroxy)-hexane-3, tert-butyl hydroperoxide, cumene hydroperoxide, p-methane hydroperoxide, cyclopentane hydroperoxide, diisopropylbenzene hydroperoxide, p-tert-butyl-cumene hydroperoxide, pinane hydroperoxide, 2,5-dimethyl-hexane-2,5-dihydroperoxide, etc., and mixtures thereof. However, other free-radical generating catalysts may be employed such as actinic radiation.

The latex of the rubbery polymer and the monomer mixture is polymerized in an inert atmosphere at temperatures in the range of 20°–100° centrigrade with agitation. Pressures of 1–100 lbs. per square inch may be employed. Although the entire amount of the monomer mixture may be present at the time that polymerization is commenced, generally it is preferable to add the monomer mixture either continuously or in increments over a portion of the polymerization cycle. Normally, additional initiator is added incrementally or continuously over that portion of the cycle during which the monomer mixture is being added. Polymerization is continued until substantially all, i.e., more than 90%, of the monomers have been polymerized. The remaining monomer mixture of other volatile components are then distilled from the latex which is dewatered, washed and dried. The latex may be dewatered by spray drying, by coagulation through the addition of salts, etc.

The total amount of monomer mixture to be added will normally amount to 50–250 parts monomer per 100 parts total rubbery polymer and preferably about 80–200 parts per 100 parts total rubbery polymer. The actual amount of monomer mixture added will vary depending upon the grafting efficiency of the reaction and the desired superstrate to substrate ratio for the graft copolymers formed by the two different particle size rubbers.

Effect of Particle Size on Graft Ratio

Generally, the particle size of the rubber polymer has an effect upon the optimum grafting level for the large particle graft copolymer and to a lesser extent on the optimum grafting level for the small graft copolymer. As will be readily appreciated, a given weight percentage of smaller size rubber particles will provide considerably greater surface area for grafting than the equivalent weight of a larger size rubber particle. Accordingly, the density of grafting produced by a given weight of graft superstrate will vary depending upon the size of the rubber particle.

Normally, the small particle rubber becomes relatively highly grafted with the conditions being selected so as to produce a superstrate to substrate ratio of 45–100:100 and preferably 60–80:100, depending upon the particle size. The large particle rubber becomes relatively lightly grafted with the polymerization conditions and the time of addition being selected to produce a superstrate to substrate ratio of about 10–45:100 and preferably 20–40:100. The residual monomers form the matrix phase polymers.

The Polymer Blend

As will be readily appreciated, the rubber content of the polymer blend produced by the graft polymerization process of the present invention may be in excess of that desired for the final product since economics generally dictate the use of high rubber levels in the graft polymerization reaction. Accordingly, the graft polymerization blend resulting from the graft polymerization reaction will normally be blended with a vinylidene copolymer of similar composition to increase the amount of matrix polymer and reduce the rubber level. This resinous polymer used for dilution of the graft copolymer may be produced by an emulsion process so that the latex thereof may be combined with the latex from the graft polymerization process and the mixed latex co-coagulated. Alternatively, the recovered graft copolymer may be admixed with a separately formed copolymer produced by emulsion, suspension or mass polymerization of alkenyl aromatic and alkenyl nitrile monomers.

Generally, the final polymer blends will contain 2–50% by weight of the total of the two rubber components. Increasing the total amount of rubber graft in the composition while maintaining the ratio of the large to small particle graft components constant generally increase the Izod impact strength of the composition but rapidly increases the viscosity of the blend and decreases the tensile strength at yield and fail and the tensile modulus. Accordingly, the preferred blends contain about 7–35% by weight of the combined graft copolymers (based upon rubber) and most desirably about 13–25% by weight thereof.

Exemplary of the efficacy of the present invention are the following specific examples wherein all parts are parts by weight based on 100 parts monomer (pphm) unless otherwise indicated.

EXAMPLES 1-3

A one gallon stainless steel reactor is charged with an anionic emulsifier and initial water and optionally with an electrolyte, a secondary emulsifier and an initial modifier. The reactor is sealed, heated to 70° C. and nitrogen purged. The monomer formulation of a diene monomer is then charged along with a water soluble free radical catalyst (potassium persulfate). After 5 to 50% conversion of the monomers, a second add of emulsifier is added along with a second add of modifier. As the polymerization proceeds pressure begins to drop and the temperature was advanced to 85° C. to a conversion of over 95%. The latex formed is vented and cooled and held for graft polymerization.

| Polymerization Materials | | |
|---|---|---|
| | Parts | Range |
| Sodium Rosinate (disproportionated rosin acid soap) emulsifier | 2.5 | 0.5-5.0 |
| Darvan (RC$_{10}$H$_6$SO$_3$) Sodium salt as secondary emulsifier | 2.0 | 0 to 5.0 |
| Electrolyte Sodium Sulfate | 2.0 | 0.1-5.0 |
| Modifier Tertiary Dodecyl Mercaptan (TDM) | 0.1 | 0-2.0 |
| Initiator (K$_2$S$_2$O$_8$) | 0.3 | 0.1-2.0 |
| Monomer (Butadiene) | 100 | 100 |
| Water | 107 | 70-400 |
| Second Soap Add (Sodium Oleate) | 3.0 | 0.5-10.0 |
| Late TDM | 0.2 | 0-3.0 |
| Polymerization Temperature | 70-85° C. | 20-100° C. |
| Latex Solids | 45% | 40-60% |

The polymerization is carried out with the late add of soap made at different levels of conversion and the rubber particle size of the rubber latex determined.

TABLE 1

| | Ex. 1 | Ex. 2 | Ex. 3 |
|---|---|---|---|
| Conversion at Soap Add | 15% | 22% | 28% |
| Rubber Particle Size Before Soap Add | 0.22 microns | 0.25 microns | 0.300 microns |
| Average Rubber Particle Size at 95% Conversion | 0.167 microns | 0.205 microns | 0.234 microns |
| Rubber Particle Size of Small Particles Formed After Soap Add | 0.157 microns (Cal) | 0.185 microns (Cal) | 0.208 microns (Cal) |

Different amounts of soap can be added versus conversion or time to provide more or less of the small particle mode of the bimodal rubber particle size distribution.

The latrices are mixed with styrene/acrylonitrile monomer mixtures (70/30) such that the mixture is present in 100 parts per 100 parts or rubber in the latex (pphr). The latex has added about 2.0 parts per 100 parts of monomer (pphm) of sodium oleate as a stabilizing emulsifier for the latex rubber particles during the chemical grafting steps. The graft reaction is carried out at about 65° C. with agitation, initiator and modifiers to conversion of about 90-96% and a latex solids content of about 35%. The initiator is K$_2$S$_2$O$_8$ at 1.0 pphm and the modifier is tertiary dodecylmercaptan at 0.7 pphm. The monomer can be added over a period of 0-3 hours to help control temperatures along with reflux conditions. The finished latices are coagulated with magnesium sulfate solutions (3%) and hindered phenol antioxidants (0.4% pphr) as a grafted rubber crumb which is filtered, washed and dried at 70°-80° C. for 16 to 20 hours. The crumb has about 35% rubber which is blended with styrene/acrylonitrile (70/30) copolymers as a matrix phase to form an ABS polyblend with about 20% rubber moiety. The polyblend is molded into $\frac{1}{2}"\times\frac{1}{2}"$ bars and tested for Izod impact strength.

The three rubbers of Examples 1-3 were grafted as described above and compounded to ABS polyblend having about 20% rubber moiety.

EXAMPLES 4-6

| | Ex. 4 | Ex. 5 | Ex. 6 |
|---|---|---|---|
| Rubber Grafted | #1 | #2 | #3 |
| Rubber Particle Size (microns) | 0.167 | 0.205 | 0.300 |
| Styrene/Acrylonitrile monomer ratio | 70/30 | 70/30 | 70/30 |
| Graft Monomers (pphr) | 100 | 100 | 100 |
| Impact Strength of Polyblend Izod (ft.lbs./in.) | 4.5 | 5.5 | 6.7 |

It is evident from the data that a high level of toughness is obtained for these polyblends using grafted rubber particles having a bimodal rubber particle size distribution even though the average rubber particle size is relatively small, i.e., around 0.200 microns. By contrast, a rubber was polymerized under the conditions of Example 1 except that the emulsifier sodium oleate was charged at 5 pphm in the beginning as an only soap add and a rubber particle size of about 0.150 microns was obtained with all particles being relatively small particles. This rubber was taken through a grafting procedure as in Example 4 and compounded to an ABS polyblend having about 20% rubber. The Izod impact strength was found to be about 3.0 ft.lbs. as compared to a similar bimode at about 4.5 ft.lbs. of toughness showing the unexpected toughening effect of the bimodal rubber particle size distribution wherein relative minor amounts of larger particles can increase toughness about 50%.

What is claimed is:
1. A process for preparing ABS polyblends by emulsion polymerization comprising:
  A. polymerizing a diene monomer formulation dispersed in an aqueous medium by using an anionic emulsifier in a first amount sufficient to disperse and form a first mode of diene rubber particles having a particle size of about 0.2 to 0.5 microns as a portion of said monomer formulation being polymerized to about 5 to 50% conversion,
  B. adding additional anionic emulsifier to said aqueous medium after step (A), in a second amount sufficient to disperse and form a second mode of diene rubber particles smaller than said first mode as said monomer formulation is further polymerized,
  C. continuing the polymerization of said monomer formulation to a total conversion of about 70 to 100% forming a latex of diene rubber particles having a bimodal rubber particle size distribution of said first and second mode rubber particles, D. charging a monomer mixture comprising alkenyl aromatic and alkenyl nitrile monomer to said latex, E. polymerizing said monomer mixture in said latex such that a first portion of said monomer is grafted to said first and second mode rubber particles with a second portion of said monomer mixture forming a matrix polymer of said monomers, F. separating said grafted rubber particles and said matrix polymer from said latex, said grafted rubber particles having a bimodal particle size distribution and being dispersed in said matrix polymer as a polymeric polyblend.

2. A process of claim 1 wherein said second mode of diene rubber particles has a particle size of about 0.01 to 0.2 microns.

3. A process of claim 1, wherein said second mode diene rubber particles comprise about 50 to 95% by weight of the bimodal rubber particle size distribution.

4. A process of claim 1 wherein said first amount of anionic emulsifier is about 0.5 to 5.0 parts per 100 parts of said monomer formulation.

5. A process of claim 1 wherein said second amount of anionic emulsifier is about 0.5 to 10 parts per 100 parts of said monomer formulation.

6. A process of claim 1 wherein the weight ratio of said aqueous medium to said monomer formulation is about 0.6:1 to 4:1.

7. A process of claim 1 wherein said polymerization of said monomer formulation and said monomer mixture is carried out at temperatures of about 20° to 100° C. with free radical initiators in amounts of about 0.1 to 2% by weight based on said monomers.

8. A process of claim 1 wherein polymerization of said monomer formulation is carried out with polymerization modifiers in an amount of about 0 to 3% by weight based on said monomers.

9. A process of claim 1 wherein the polymerization of said monomer mixture is carried out in a latex wherein a final solids content of about 25 to 60% by weight will be present in said latex.

10. A process of claim 1 wherein said diene monomer formulation is butadiene, butadiene-styrene, butadiene-acrylonitrile, chloroprene or isoprene.

11. A process of claim 1 wherein said monomer mixture is styrene and acrylonitrile.

12. A process of claim 1 wherein said diene rubber particles are grafted in the presence of said monomer mixture in amount of about 50 to 250 parts by weight of monomer per 100 parts of rubber moiety.

13. A process of claim 1 wherein said monomer mixture has present said alkenyl aromatic and said alkenyl nitrile monomers in a weight ratio of about 85:15 to 60:40 respectively.

14. A process of claim 1 wherein said diene monomer formulation comprises about 70 to 100% by weight butadiene monomer based on said formulation.

15. A process of claim 1 wherein said matrix polymer is a polymer of said second portion of the monomer mixture comprising styrene and acrylonitrile.

16. A process of claim 1 wherein said anionic emulsifier is an alkali salt of an organic carboxylic acid having a chain length of about $C_{12}$ to $C_{18}$ carbons or mixtures thereof.

17. A process of claim 1 wherein said anionic emulsifier is a rosin acid soap.

18. A process of claim 1 wherein said anionic emulsifier is an alkyl or alkylaryl sulfate of sulfonate.

19. A process of claim 1 wherein said anionic emulsifier is a rubber reserve soap based on alkaline salts of fatty acids consisting essentially of a mixture palmitic, stearic and oleic acids.

20. A process of claim 1 wherein said aqueous medium has present about 0.1 to 3.0 parts per 100 parts of monomer of an electrolyte.

21. A process of claim 1 wherein the polymerization of said monomer formulation is carried out in the presence of a secondary emulsifier.

* * * * *